United States Patent
Kim

(10) Patent No.: US 9,415,729 B2
(45) Date of Patent: Aug. 16, 2016

(54) DASH PAD FOR VEHICLE

(71) Applicant: Hyundai Motor Company, Seoul (KR)

(72) Inventor: Min Su Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/693,928

(22) Filed: Apr. 23, 2015

(65) Prior Publication Data

US 2015/0307038 A1 Oct. 29, 2015

(30) Foreign Application Priority Data

Apr. 23, 2014 (KR) .................. 10-2014-0048459
Dec. 15, 2014 (KR) .................. 10-2014-0180236

(51) Int. Cl.

| E04B 1/86 | (2006.01) |
|---|---|
| B60R 13/08 | (2006.01) |
| G10K 11/168 | (2006.01) |
| B32B 37/12 | (2006.01) |
| B32B 37/18 | (2006.01) |

(52) U.S. Cl.
CPC .............. B60R 13/0838 (2013.01); B32B 37/12 (2013.01); B32B 37/18 (2013.01); G10K 11/168 (2013.01); *B32B 2305/28* (2013.01); *B32B 2307/102* (2013.01); *B32B 2398/20* (2013.01); *B32B 2605/003* (2013.01)

(58) Field of Classification Search
CPC ............................................... E04B 1/86
USPC ........................................... 181/290
See application file for complete search history.

(56) References Cited

U.S. PATENT DOCUMENTS

| 5,886,306 A * | 3/1999 | Patel et al. ................. 181/290 |
| 2006/0065482 A1 | 3/2006 | Schmidft et al. |
| 2008/0050565 A1 * | 2/2008 | Gross et al. .................. 428/212 |
| 2008/0230309 A1 * | 9/2008 | Fox et al. ..................... 181/286 |
| 2009/0188748 A1 * | 7/2009 | Stevenson et al. ............ 181/294 |
| 2010/0219014 A1 * | 9/2010 | Oosting et al. ............... 181/290 |
| 2013/0098707 A1 * | 4/2013 | Yamamoto et al. ........... 181/290 |
| 2013/0153330 A1 * | 6/2013 | Fushiki ........................ 181/290 |
| 2014/0110963 A1 * | 4/2014 | Kuroda et al. ............... 296/39.3 |
| 2014/0246268 A1 * | 9/2014 | Fushiki ........................ 181/290 |
| 2014/0262603 A1 * | 9/2014 | Johnson ....................... 181/211 |
| 2014/0332313 A1 * | 11/2014 | Bischoff et al. .............. 181/290 |

FOREIGN PATENT DOCUMENTS

| JP | 09-109312 A | 4/1997 |
| KR | 10-2005-22144 | 3/2005 |
| KR | 10-2008-0108571 A | 12/2008 |
| KR | 10-0950602 B1 | 4/2010 |
| KR | 10-2013-0039363 | 4/2013 |
| KR | 10-2013-0080541 | 7/2013 |
| KR | 10-1308502 B1 | 9/2013 |
| KR | 10-1375442 B1 | 3/2014 |
| WO | 2011/077482 A1 | 6/2011 |

* cited by examiner

*Primary Examiner* — Forrest M Phillips
(74) *Attorney, Agent, or Firm* — Mintz Levin Cohn Ferris Glovsky and Popeo, P.C.; Peter F. Corless

(57) ABSTRACT

Disclosed is a low-weight sound-absorbing type dash pad for a vehicle which can maximize sound-absorbing and sound blocking performances, reduce manufacturing cost and steps of processes, and improve in-line work efficiency. In particular, the low-weight sound-absorbing type dash pad for a vehicle is manufactured by bonding a first sound-absorbing layer made of microfibers, a sound-blocking layer made of thermoplastic resin, and a second sound-absorbing layer made of thermoplastic fiber or thermoplastic multi-lobal fiber to each other.

9 Claims, 4 Drawing Sheets

DASH PAD FOR VEHICLE

CROSS-REFERENCE TO RELATED APPLICATION

This application claims under 35 U.S.C. §119(a) the benefit of Korean Patent Application Nos. 10-2014-0048459 and 10-2014-0180236 filed on Apr. 23, 2014 and Dec. 15, 2014, respectively, the entire contents of which are incorporated herein by reference.

TECHNICAL FIELD

The present invention relates to a low-weight sound-absorbing type dash pad. In particular, the low-weight sound-absorbing type dash pad may be formed by bonding a sound-absorbing layer made of microfibers and a sound-blocking layer to each other.

BACKGROUND

In general, a dash panel as a sound-absorbing/blocking member is mounted at the boundary between an engine room and an indoor of a vehicle and absorbs and blocks engine noise transmitted to the indoor is mounted on the dash panel.

Accordingly, the dash pad may block, remove, and absorb noise from the engine and may prevent high or low-frequency complex energy generated in driving from being transmitted to the indoor of the vehicle.

For example, the dash pads for vehicles in the related art may have structures formed by stacking different materials having different thicknesses and weight based on the types of vehicles, as listed in the following Table 1.

TABLE 1

| Item | Existing dash pad (Arrangement: Sound-absorbing layer –> Sound-blocking layer) |
|---|---|
| 1 | PU(85K) + PA6 film (50 g) + TPE (2.5 t) + PET (1,000 g) [or Modified cross-section fiber (1,000 g)]: Large-size car PA6 film: To bond an sound-absorbing layer and a sound-blocking layer (functioning as an adhesive) |
| 2 | PU(85K) + PA6 film (50 g) + Hard PET(1,000 g): Small-sized car, gasoline PU(85K) + H/layer (1.5 t) + Hard PET(1,000 g): Small-sized car, diesel |
| 3 | PU(85K) + PA6 film (50 g) + Hard PET(800 g): RV gasoline PU(85K) + EVA(2.0 t) + Hard PET(800g): RV diesel |
| 4 | Soft PET + Hard PET |

The dash pads listed in Table 1, as illustrated in FIG. 1, may have stacked structures of two to four layers including a sound-absorbing layer at the engine room side and a sound-blocking layer at the indoor.

Although the conventional dash pads are manufactured in the structures formed by stacking different materials in two to four layers for the types of vehicles in order to improve sound-absorbing/blocking performance, the PU material has been used for the sound-absorbing layer and the hard PET also has been used for the sound-blocking layer, and thus, the weight and manufacturing costs may generally increased to improve sound-absorbing/blocking performance for each type of vehicles.

Moreover, a start mold and a mass production mold may be required for testing performance in mass production, and further, a mold, a trimming mold, and a PU foaming mold may be used for producing actual products, such that the investment cost and manufacturing cost have increased. Further, there is a need of a film (PA6) for bonding the sound-absorbing layer and the sound-blocking layer, and thus the manufacturing cost and the number of process may increase.

The above information disclosed in this Background section is only for enhancement of understanding of the background of the invention and therefore it may include information that does not form the prior art that is already known in this country to a person of ordinary skill in the art.

SUMMARY OF THE INVENTION

Thus, the present invention has been made in an effort to solve the above-described problems associated with the related arts.

Accordingly, the present invention provides a low-weight sound-absorbing type dash pad for a vehicle thereby maximizing sound-absorbing/blocking performance and reducing noise in the interior of a vehicle.

Further, the present invention provides a low-weight sound-absorbing type dash pad for a vehicle which may be manufactured with reduced steps of processes and improved in-line work efficiency, thereby improving fuel efficiency with reduction in weight and reducing manufacturing cost of a vehicle.

In one aspect, according to an exemplary embodiment of the present invention, the present invention provides a low-weight sound-absorbing type dash pad for a vehicle. The low-weight sound-absorbing type dash pad may comprise: a first sound-absorbing layer made of microfibers; a sound-blocking layer made of thermoplastic resin; and a second sound-absorbing layer made of thermoplastic fiber or thermoplastic multi-lobal fiber. For example, the low-weight sound-absorbing type dash pad may be manufactured by bonding the first sound-absorbing layer made of microfibers, the sound-blocking layer made of thermoplastic resin, and the second sound-absorbing layer made of thermoplastic fiber or thermoplastic multi-lobal fiber to each other.

In particular, the microfibers may be obtained by twisting melt-blown polypropylene fibers and polypropylene staple fibers together in about 100 to about 1,000 $g/m^2$.

The sound-blocking layer may be made of one or two selected from olefin-based resin and thermoplastic elastomer, and may have a unit weight of about 100 to 5,000 $g/m^2$.

The second sound-absorbing layer may be made of non-woven fabric of polyethylene terephthalate (PET) containing low-melting fibers in an amount of about 10 wt % to 50 wt % based on the total weight of the second sound-absorbing layer. The low-melting fibers may be composite fibers of polyethylene/polyethylene terephthalate, composite fibers of polyethylene/polypropylene, or composite fibers of polypropylene/polyethylene terephthalate, and may have a unit weight of 100 to 2,000 $g/m^2$.

The dash pad may be installed on a dash panel in a vehicle and the first sound-absorbing layer may be disposed close to the engine room that is an inflow side of noise.

Further provided is a vehicle that comprises the dash pad described herein.

Still further provided is a method of manufacturing the low-weight sound-absorbing type dash pad for a vehicle as described herein. For example, the method may comprise: bonding a first sound-absorbing layer made of microfibers, a sound-blocking layer made of thermoplastic resin, and a second sound-absorbing layer made of thermoplastic fiber or thermoplastic multi-lobal fiber, to each other.

The present invention may provide the following effects from various exemplary embodiments.

First, since the microfibers of about 100 to about 1,000 g per area ($m^2$) is used as a sound-absorbing layer and bonded to a sound-blocking layer, the sound-absorbing/blocking performance may be maximized due to substantial sound-absorbing performance of microfibers and the weight thereof may be reduced.

Second, since microfibers are used instead of polyurethane that is generally used for sound-absorbing layers in the related art, a polyurethane foaming mold may not be needed, and accordingly, productivity may be improved and manufacturing cost may be reduced.

Third, since PA6 film and a bonding process may not be necessary for bonding a sound-absorbing layer and a sound-blocking layer which are used in the related art, manufacturing cost and steps of processes may be reduced.

Other aspects of the invention are discussed infra.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1A:
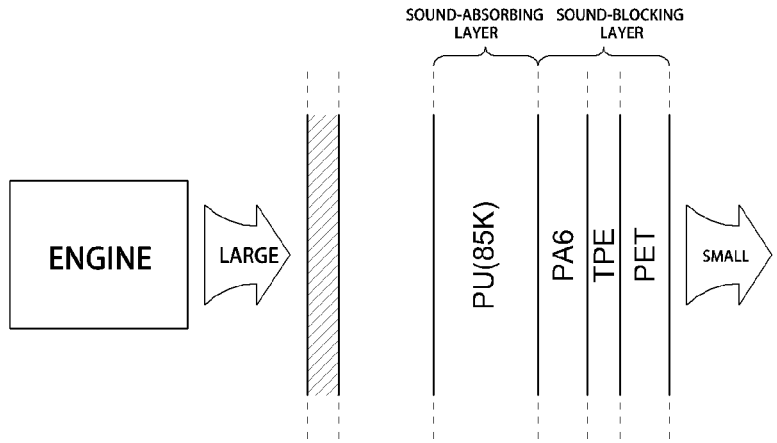
FIGS. 1A-1D illustrate general configurations of dash pads in the related arts.
Figure 1B:
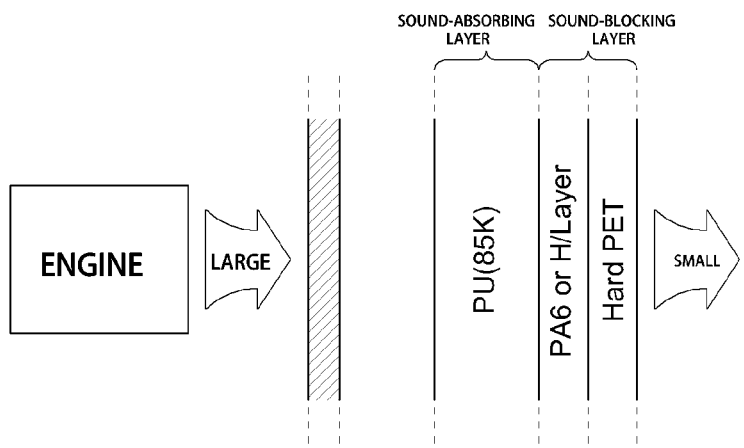
Figure 1C:
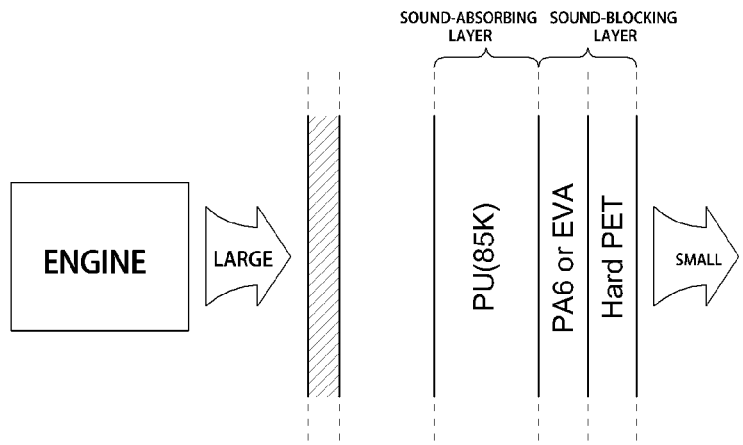
Figure 1D:
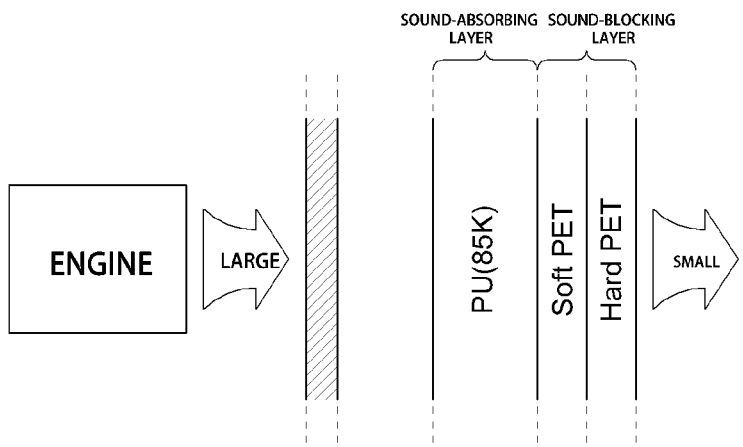

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
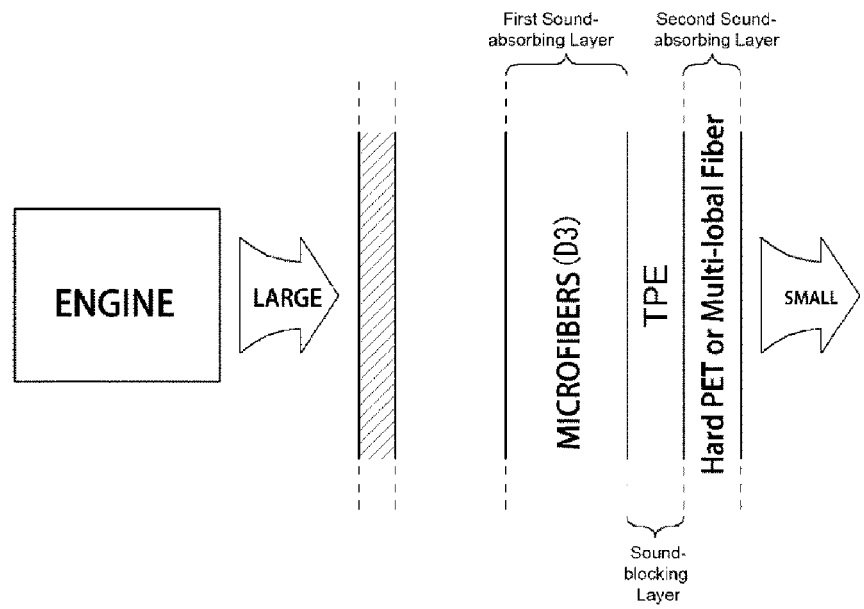
FIG. 2 illustrates an exemplary configuration of an exemplary low-weight sound-absorbing type dash pad for a vehicle according to an exemplary embodiment of the present invention.

As shown in FIG. 2, the present invention provides a dash pad as of a sound-absorbing/blocking member which may be attached to the dash panel in a vehicle to absorb and block engine sound transmitted to the indoor. The low-weight sound-absorbing type dash pad may comprise: a first sound-absorbing layer made of microfibers; a sound-blocking layer made of thermoplastic resin; and a second sound-absorbing layer made of thermoplastic fiber or thermoplastic multi-lobal fiber. Particularly, the dash pad may have a structure formed by bonding the first sound-absorbing layer made of microfibers, the sound-blocking layer made of thermoplastic resin, and the second sound-absorbing layer made of thermoplastic fiber or thermoplastic multi-lobal fiber to each other.

The microfibers used for the first sound-absorbing layer may be made by twisting melt-blown polypropylene fibers and polypropylene staple fibers together in about 100 to 1,000 g/m².

For example, when a melt-blown polypropylene fiber is released, like scattering, down on a die wound with a melt-blown polypropylene fiber, by supplying air pulsing to the melt-blown polypropylene fiber at a side and blowing a polypropylene staple fiber to the melt-blown polypropylene fiber at the other side, the microfibers of about 100 to 1,000 g/m² made by twisting a melt-blown polypropylene fiber and a polypropylene staple fiber together may be obtained.

The sound-blocking layer may be stacked between the first sound-absorbing layer and the second sound-absorbing layer. The sound-blocking layer may be made of thermoplastic resin and the second sound-absorbing layer may be made of thermoplastic fibers or thermoplastic multi-lobal fibers.

The sound-blocking layer may also have a function of bonding the first sound-absorbing layer and the second sound-absorbing layer, in addition to a function of blocking sound.

In an exemplary embodiment of the present invention, the sound-blocking layer may be made of one or two selected from the olefin-based resin as thermoplastic resin and thermoplastic olefin (TPO) as thermoplastic elastomer. The sound-blocking layer may have a unit weight of about 100 to 5,000 g/m².

Further, the second sound-absorbing layer may be made of polyethylene terephthalate (PET), hard PET thermoplastic fibers or thermoplastic multi-lobal fibers, or particularly, non-woven fabric of polyethylene terephthalate (PET) containing low-melting fibers of about 10 wt % to 50 wt % based on the total weight of the second sound-absorbing layer.

The low-melting fibers may be composite fibers of polyethylene/polyethylene terephthalate, composite fibers of polyethylene/polypropylene, or composite fibers of polypropylene/polyethylene terephthalate. The low-melting fibers may have a unit weight of about 100 to 2,000 g/m².

Moreover, the method of manufacturing the low-weight sound-absorbing type dash pad is provided. The method may comprise: bonding a first sound-absorbing layer made of microfibers, a sound-blocking layer made of thermoplastic resin, and a second sound-absorbing layer made of thermoplastic fiber or thermoplastic multi-lobal fiber, to each other. Each layer may be bonded to each other by any bonding means generally used in the related arts.

When the dash pad of the present invention is used for dash panels of vehicles, the first sound-absorbing layer may be disposed close to an engine room that is the inflow side of noise and the sound-blocking layer and the second sound-blocking layer may be disposed at the indoor of the vehicle that is opposite from the inflow side of noise.

Hereafter, an Example of the present invention is described in more detail with Comparative Examples, but the present invention is not limited by the following Example.

EXAMPLE

A dash pad having a size of about 840 mm×about 840 mm was manufactured by sequentially stacking microfibers of D3 for a first sound-absorbing layer, thermoplastic elastomer (TPE) as a sound-blocking layer, and polyethylene terephthalate (PET) as a second sound-absorbing layer.

For reference, the term 'D3' indicates the grade of microfibers, the term 'D1' means 130 g per area (m²), the term 'D2' means 230 g per area (m²), and the term 'D3' means 330 g per area (m²).

In the Example, the microfibers as indicated with 'D3' grade were fabricated by twisting melt-blown polypropylene fibers and polypropylene staple fibers in about 330 g/m².

Further, in the configuration of the dash pad according to an Example listed in the following Table 2, the term 'D3 (high)' means that the microfibers (D3) are arranged at the inflow side of noise (close to an engine room in a vehicle).

TABLE 2

| | Size | Remark |
|---|---|---|
| Comparative example 1 | 840 mm × 840 mm | PET + TPE + PU (high) |
| Comparative example 2 | 840 mm × 840 mm | PET + TPE + PU (low) |
| Embodiment | 840 mm × 840 mm | PET + TPE + D3 (high) |
| Comparative example 3 | 840 mm × 840 mm | PET + TPE + D3 (low) |
| Comparative example 4 | 840 mm × 840 mm | PET + TPE + PET + D3 (high) |
| Comparative example 5 | 840 mm × 840 mm | PET + TPE + PET + D3 (low) |

Comparative Examples 1 and 2

As Comparative Examples 1 and 2, a dash pad having a size of about 840 mm×about 840 mm was manufactured by sequentially stacking polyethylene terephthalate (PET), thermoplastic elastomer (TPE), and polyurethane (PU).

For reference, in Table 2, the term 'PU (high)' means that the polyurethane (PU) is disposed at the inflow side of noise and the term 'PU (low)' means that the polyurethane (PU) is disposed at the opposite side to the inflow side of noise.

Comparative Example 3

As in the Example described above, a dash pad having a size of 840 mm×840 mm was manufactured by sequentially stacking microfibers of D3 as a first sound-absorbing layer, thermoplastic elastomer (TPE) for a sound-blocking layer, and polyethylene terephthalate (PET) for a second sound-absorbing layer, but this structure was turned over so that the microfibers (D3) were arranged at the opposite side to the inflow side of noise.

Figure 3:
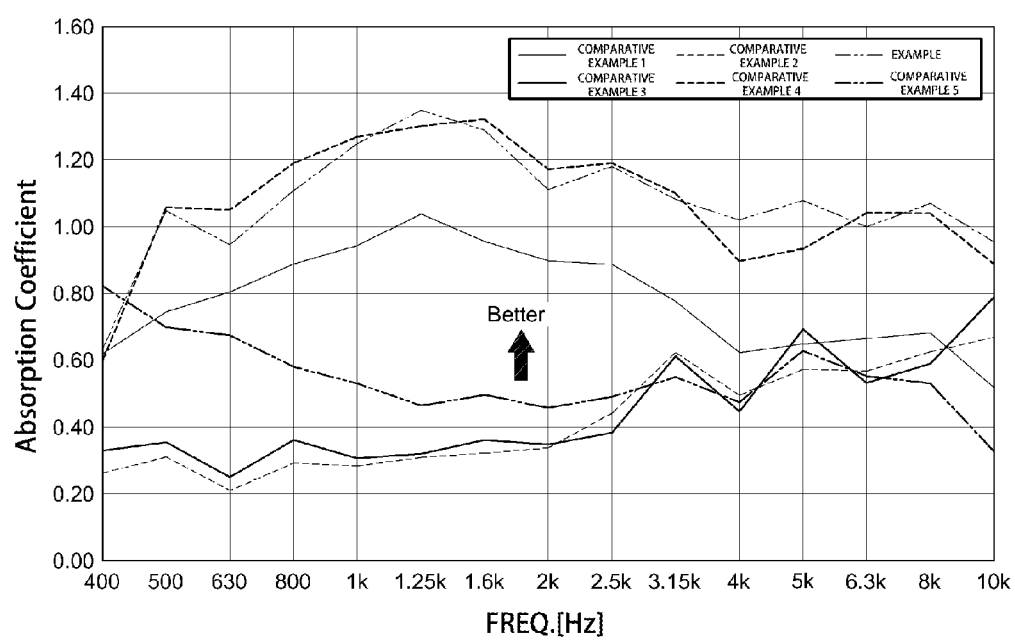
FIG. 3 is an exemplary graph showing an exemplary sound-absorbing test result of an exemplary low-weight sound-absorbing type dash pad for a vehicle according to an exemplary embodiment of the present invention.

For reference, the term 'D3 (low)' in Table 2 and FIG. 3 means that the microfibers (D3) are arranged at the opposite side (indoor of the vehicle) to the inflow side of noise.

Comparative Examples 4 and 5

As Comparative Examples 4 and 5, a dash pad having a size of about 840 mm×about 840 mm was manufactured by sequentially stacking microfibers of D3 for a sound-absorbing layer, and polyethylene terephthalate (PET), thermoplastic elastomer (TPE), and polyethylene terephthalate (PET) for a sound-blocking layer.

For reference, the term 'D3 (high)' in Table 2 and Comparative Example 4 means that the microfibers (D3) are arranged at the inflow side of noise, and the term 'D3 (low)' in Comparative Example 5 means that the microfibers are arranged at the opposite side to the inflow side of noise.

Test Example 1

A sound-absorbing ratio of dash pads of an Example and Comparative Examples were tested, using Alpha Cabin Measurement: Absorption was measured to examine a sound-absorbing performance of the dash pads according to the Example and Comparative Examples and the results are listed in Table 3 and illustrated in FIG. 3.

TABLE 3

| Item | 400 | 500 | 630 | 800 | 1k | 1.25k | 1.6k | 2k | 2.5k | 3.15k | 4k | 5k | 6.3k | 8k | 10k |
|---|---|---|---|---|---|---|---|---|---|---|---|---|---|---|---|
| Comparative example 1 | 0.62 | 0.75 | 0.80 | 0.89 | 0.95 | 1.04 | 0.96 | 0.89 | 0.62 | 0.78 | 0.62 | 0.65 | 0.67 | 0.68 | 0.52 |
| Comparative example 2 | 0.26 | 0.31 | 0.21 | 0.29 | 0.28 | 0.31 | 0.32 | 0.34 | 0.44 | 0.62 | 0.50 | 0.57 | 0.57 | 0.63 | 0.67 |
| Embodiment | 0.63 | 1.05 | 0.94 | 1.11 | 1.25 | 1.35 | 1.29 | 1.11 | 1.18 | 1.08 | 1.02 | 1.08 | 1.00 | 1.07 | 0.95 |

TABLE 3-continued

| Item | 400 | 500 | 630 | 800 | 1k | 1.25k | 1.6k | 2k | 2.5k | 3.15k | 4k | 5k | 6.3k | 8k | 10k |
|---|---|---|---|---|---|---|---|---|---|---|---|---|---|---|---|
| Comparative example 3 | 0.33 | 0.35 | 0.25 | 0.36 | 0.31 | 0.32 | 0.36 | 0.35 | 0.38 | 0.61 | 0.45 | 0.69 | 0.53 | 0.59 | 0.79 |
| Comparative example 4 | 0.60 | 1.06 | 1.05 | 1.19 | 1.27 | 1.30 | 1.32 | 1.17 | 1.19 | 1.10 | 0.90 | 0.93 | 1.04 | 1.04 | 0.89 |
| Comparative example 5 | 0.82 | 0.70 | 0.68 | 0.58 | 0.53 | 0.46 | 0.50 | 0.46 | 0.49 | 0.55 | 0.47 | 0.63 | 0.55 | 0.53 | 0.33 |

As shown in Table 3 and FIG. 3, the sound-absorbing ratio of the dash pad formed by sequentially stacking and bonding PET+TPE+D3 (high) according to the Example of the present invention was greater than those in the Comparative Examples.

Test Example 2

In order to examine sound-blocking performance of the dash pads according to an Example and Comparative Examples, the sound transmission loss ratio was tested by APA MAT TEST: STL (Sound trans loss) and the results are listed in the following Table 4 and illustrated in the following FIG. 4.

TABLE 4

| Item | 400 | 500 | 630 | 800 | 1k | 1.25k | 1.6k | 2k | 2.5k | 3.15k | 4k | 5k | 6.3k | 8k |
|---|---|---|---|---|---|---|---|---|---|---|---|---|---|---|
| Comparative example 1 | 19.30 | 23.70 | 18.90 | 32.40 | 31.80 | 37.10 | 40.30 | 45.70 | 47.00 | 48.20 | 40.60 | 46.20 | 40.70 | 39.00 |
| Comparative example 2 | 23.10 | 28.40 | 29.00 | 31.00 | 36.40 | 38.80 | 37.80 | 38.20 | 39.10 | 41.20 | 35.50 | 39.80 | 34.30 | 27.80 |
| Embodiment | 21.00 | 26.50 | 21.00 | 36.80 | 39.10 | 37.50 | 39.90 | 42.80 | 43.90 | 45.50 | 38.70 | 43.50 | 38.50 | 36.30 |
| Comparative example 3 | 18.40 | 28.30 | 29.50 | 32.10 | 39.60 | 40.40 | 36.40 | 37.20 | 38.10 | 40.40 | 34.60 | 38.60 | 33.70 | 27.90 |
| Comparative example 4 | 16.50 | 23.50 | 17.70 | 27.20 | 21.80 | 29.00 | 30.90 | 38.40 | 35.70 | 37.50 | 41.20 | 42.60 | 38.40 | 41.10 |
| Comparative example 5 | 10.70 | 20.60 | 19.70 | 20.80 | 28.60 | 33.80 | 32.50 | 33.90 | 34.20 | 36.90 | 33.90 | 37.10 | 32.70 | 27.50 |

Figure 4:
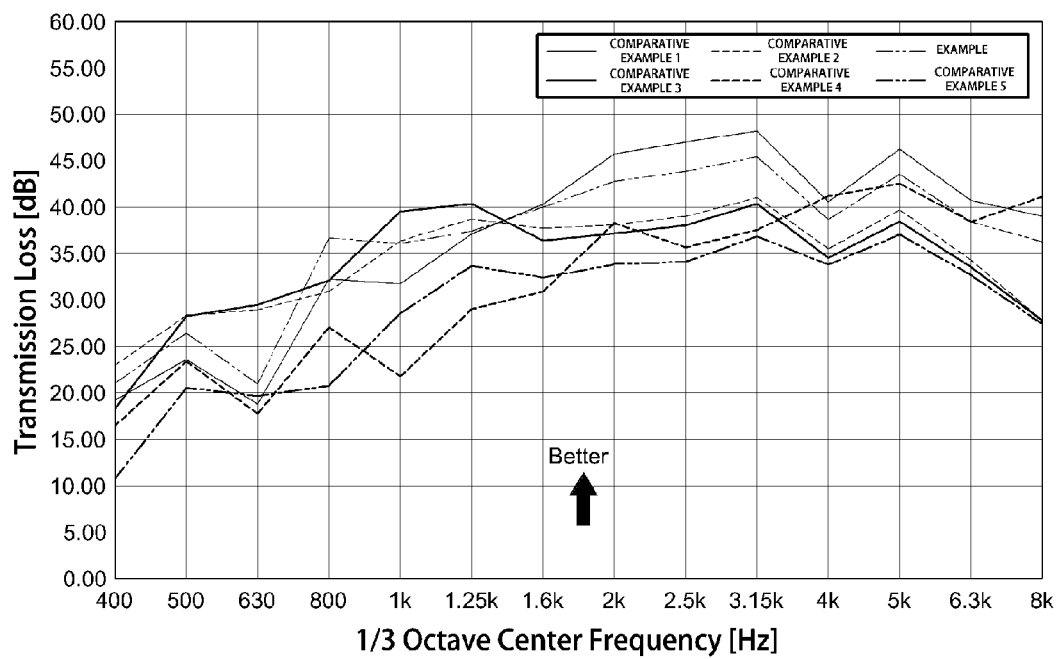
FIG. 4 is an exemplary graph illustrating an exemplary sound-blocking test result of a low-weight sound-absorbing type dash pad for a vehicle according to an exemplary embodiment of the present invention.

As shown in Table 4 and FIG. 4, the sound transmission loss ratio of the dash pad formed by sequentially stacking and bonding PET+TPE+D3 (high) according to the Example of the present invention maintained an equivalent level to those in the Comparative Examples although periods were different.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A low-weight sound-absorbing type dash pad for a vehicle, comprising:
   a first sound-absorbing layer made of microfibers;
   a sound-blocking layer made of thermoplastic resin; and
   a second sound-absorbing layer made of thermoplastic fiber or thermoplastic multi-lobal fiber,
   wherein the low-weight sound-absorbing type dash pad is manufactured by bonding the first sound-absorbing, the sound-blocking layer, and the second sound-absorbing layer to each other,
   wherein the microfibers are obtained by twisting melt-blown polypropylene fibers and polypropylene staple fibers together in about 100 to 1,000 g/m$^2$.

2. The low-weight sound-absorbing type dash pad for a vehicle of claim 1, wherein the sound-blocking layer is made of one or two selected from olefin-based resin and thermoplastic elastomer.

3. The low-weight sound-absorbing type dash pad for a vehicle of claim 1, wherein the sound-blocking layer has a unit weight of about 100 to 5,000 g/m$^2$.

4. The low-weight sound-absorbing type dash pad for a vehicle of claim 1, wherein the second sound-absorbing layer is made of non-woven fabric of polyethylene terephthalate (PET) containing low-melting fibers of about 10 wt % to 50 wt % based on the total weight of the second sound-absorbing layer.

5. The low-weight sound-absorbing type dash pad for a vehicle of claim 4, wherein the low-melting fibers are composite fibers of polyethylene/polyethylene terephthalate, composite fibers of polyethylene/polypropylene, or composite fibers of polypropylene/polyethylene terephthalate.

6. The low-weight sound-absorbing type dash pad for a vehicle of claim 4, wherein the low-melting fibers have a unit weight of about 100 to 2,000 g/m$^2$.

7. The low-weight sound-absorbing type dash pad for a vehicle of claim 1, wherein the low-weight sound-absorbing type dash pad is installed on a dash panel in a vehicle and the first sound-absorbing layer disposed close to an engine room that is an inflow side of noise.

8. A vehicle that comprises a low-weight sound-absorbing type dash pad for a vehicle of claim 1.

9. A method of manufacturing a low-weight sound-absorbing type dash pad for a vehicle, comprising: bonding a first sound-absorbing layer made of microfibers, a sound-blocking layer made of thermoplastic resin, and a second sound-absorbing layer made of thermoplastic fiber or thermoplastic multi-lobal fiber, to each other,
   Wherein, the microfibers are obtained by twisting melt-blown polypropylene fibers and polypropylene staple fibers together in 100 to 1000 g/m2 by supplying air pulsing to the melt-blown polypropylene fiber at a side and blowing a polypropylene staple fiber to the melt-blown polypropylene fiber at the other side, when the melt-blown polypropylene fibers are released down on a die wound with a melt-blown polypropylene fiber.

* * * * *